Sept. 6, 1927.  
J. W. WHITLOCK  
1,641,718  
VARIABLE AIR CONDENSER AND COUPLING MEANS THEREFOR  
Filed April 28, 1925   2 Sheets-Sheet 1
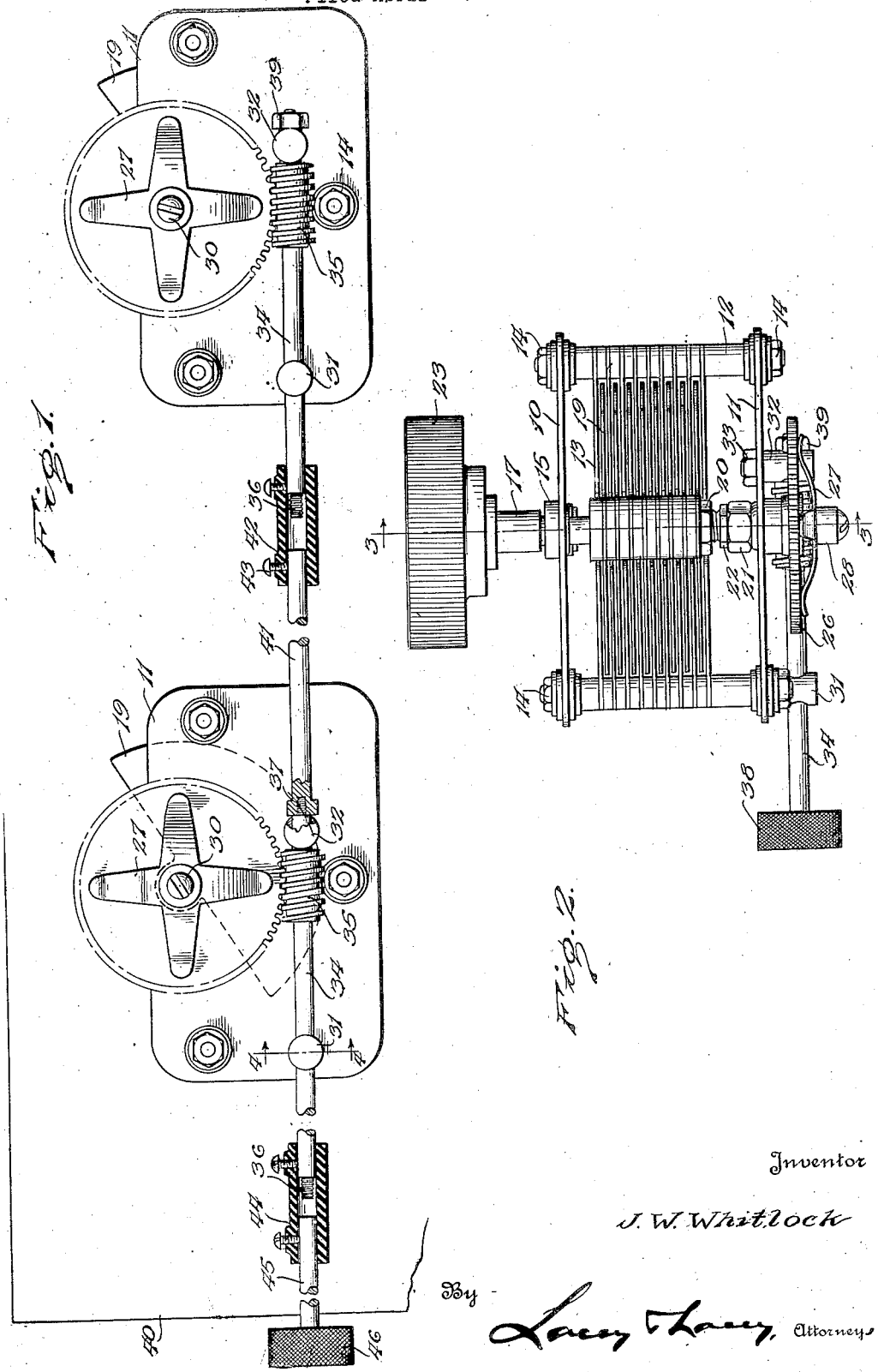
Inventor  
J. W. Whitlock  
By Lacey & Lacey, Attorneys

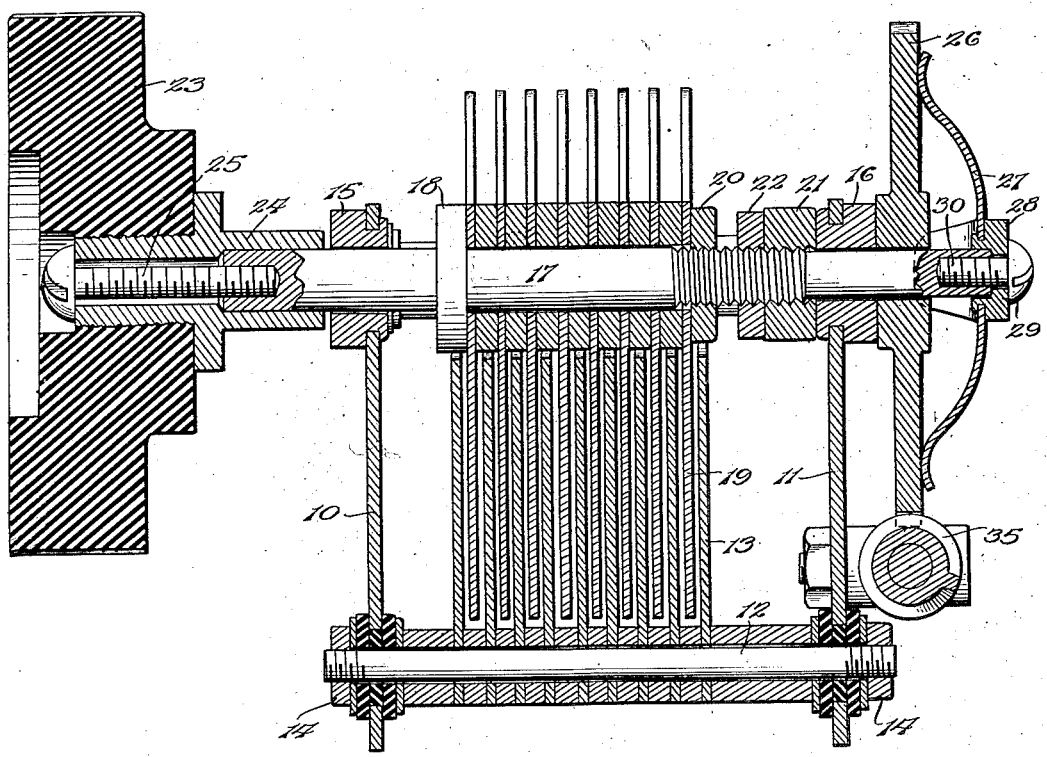
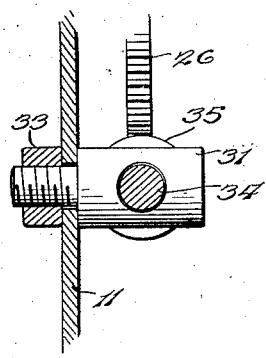

Patented Sept. 6, 1927.

1,641,718

UNITED STATES PATENT OFFICE.

JOHN W. WHITLOCK, OF RISING SUN, INDIANA.

VARIABLE AIR CONDENSER AND COUPLING MEANS THEREFOR.

Application filed April 28, 1925. Serial No. 26,492.

This invention relates to an improved variable air condenser and coupling means therefor, and seeks, among other objects, to provide a mechanism whereby the rotors of a number of condensers may be adjusted in unison for varying the capacity of all of said condensers simultaneously while, when desired, the rotor of each condenser may be adjusted independently.

The invention seeks, as a further object, to provide a condenser wherein the rotor may be directly adjusted by means of the rotor shaft and wherein the rotor may also be minutely adjusted by means of a worm.

And the invention seeks, as a still further object, to provide a condenser wherein the rotor may be adjusted by its shaft independently of the worm and vice versa, and wherein the clutch spring employed in connection with the worm drive will serve to hold the shaft against endwise movement and thus prevent variation in the capacity of the condenser from such cause.

Other and incidental objects will appear hereinafter.

In the accompanying drawings:

Figure 1 is a rear elevation showing a pair of the improved condensers coupled together.

Figure 2 is a top plan view of the condenser.

Figure 3 is an enlarged vertical sectional view on the line 3—3 of Figure 2, looking in the direction indicated by the arrows.

Figure 4 is a detail sectional view on the line 4—4 of Figure 1, looking in the direction indicated by the arrows.

In carrying the invention into effect, I employ a frame including front and rear end plates 10 and 11 rigidly connected by cross rods 12 insulated with respect to said plates, and fixed on said rods is a plurality of spaced parallel stator plates 13, the whole being held in assembled relation by nuts 14 on the rods. Fixed to the plates 10 and 11 are alined front and rear bearings 15 and 16 and journaled through said bearings is a rotor shaft 17 having a stop collar 18. Fixed on said shaft is a plurality of spaced parallel rotor plates 19 disposed to pass between the plates 13 as the shaft is rotated, and screwed on the shaft is a nut 20 clamping the rotor plates between said nut and the collar 18. Screwed on the shaft to abut the inner end of the bearing 16 is a nut 21 limiting the shaft against rearward endwise movement but adjustable, however, to permit rearward movement of the shaft for centering the plates 19 between the plates 13, and abutting the nut 21 is a lock-nut 22.

Fixed to the forward end of the shaft is an operating knob 23 of suitable insulating material, which knob is provided with a sleeve 24 fitting over the shaft, and freely accommodated by said sleeve is a cap screw 25 screwed into the shaft for detachably connecting the knob therewith. Thus, as will be seen, the knob 23 may be turned for rotating the shaft and consequently adjusting the plates 19 with respect to the plates 13 to vary the capacity of the condenser.

The shaft 17 is of a length to project rearwardly beyond the bearing 16 and rotatably fitting the projecting end portion of the shaft is a worm gear 26 abutting the outer end of said bearing. Coacting with said gear is a spider-like clutch spring 27 having radial spring fingers which are curved laterally and bowed upwardly near their ends to frictionally bear against the rear face of the gear, and fixed to said spring is an axial hub 28 counterbored to fit over the shaft as well as to form a flange 29 abutting the rear end face of the shaft. Extending freely through said flange is a cap screw 30 screwed into the shaft for binding the hub thereon and connecting the spring and shaft to turn in unison. As the screw 29 is tightened the fingers of the spring are flexed against the worm gear and are thus brought under tension to yieldably bear against the gear. Accordingly, the spring will exert a rearward strain on the rotor shaft for maintaining the nut 21 against the inner end of the bearing 16 and holding the shaft against endwise play to thus prevent variation in the capacity of the condenser such as would, due to the change in the spacing between the plates 13 and 19, otherwise occur from such cause.

Fixed to the rear end plate 11 of the stator frame are alined rearwardly directed posts 31 and 32 which, as shown in detail in Figure 4, are secured to the plate by nuts 33, and journaled through said posts is a worm shaft 34 to which is fixed a worm 35 meshing with the worm gear 26. The worm abuts the post 32 at one side thereof and formed on the shaft at its ends are reduced threaded studs 36 and 37. If the condenser is to be used singly, a knob 38 is screwed on the stud 36 while a nut 39 is screwed on the stud 37 to abut the post 32 at the side thereof opposite the worm so that the worm and said nut will coact with the post for limiting the shaft against endwise movement. However, I have provided means for coupling the shafts 34 of a number of the condensers so that said shafts may be turned for varying the capacity of the several condensers in unison. In Figure 1 of the drawings, I have illustrated a pair of the condensers mounted in spaced relation upon a conventional panel 40 so that the shafts 34 thereof are alined, and screwed at one end over the stud 37 of the shaft 34 of the condenser seen at the left is an extension shaft 41. Fitting over the opposite end of the shaft 34 of the condenser seen at the right is an insulating sleeve 42 and screwed through the wall of the sleeve to impinge the shafts are set screws 43 connecting the shafts to turn in unison. A like sleeve 44 is fixed to the outer end of the shaft 34 of the condenser seen at the left and connects a shaft 45 with the former shaft. The shaft 45 projects beyond the adjacent end of the panel and carries a knob 46.

As will now be seen in view of the foregoing, the shaft 17 of either condenser may, by means of its knob 23, be turned for directly and independently adjusting the rotor plates of said condenser. As will be better appreciated upon reference to Figure 3, when either rotor shaft is turned, the clutch spring 27 of the shaft will, since the gear 26 is locked against rotation by the worm 35, ride over the rear face of the gear so that the rotor plates may be freely adjusted while the spring will serve to frictionally lock said plates in adjusted position. However, by turning the knob 46, the worms 35 of both condensers may be rotated to simultaneously turn the gears 26 of said condensers, when the clutch springs 27 will coact with the gears for coupling the rotor shafts 17 therewith. Accordingly, the shafts of both condensers will be turned in unison to position the rotor plates so that the capacity of the condensers may thus be adjustably varied in unison by means of the single control knob 46. Furthermore, as will be appreciated, the worm drive provides a means whereby the rotor plates may be minutely set.

Having thus described the invention, what I claim is:

In apparatus of the character specified, the combination of a spindle, a bearing therefor, a stop adjustable on the spindle and engaging a side of the said bearing, means for locking the said stop, a worm gear loose on the spindle and in frictional contact with the opposite side of the bearing, a pressure member rotatable with the spindle and yieldably holding the worm gear in frictional contact with the said bearing, and a worm shaft in mesh with the worm gear to coact therewith to prevent casual movement of the spindle and serve as operating means therefor when required.

In testimony whereof I affix my signature.

JOHN W. WHITLOCK. [L. S.]